US 6,689,181 B2

(12) United States Patent
Highsmith et al.

(10) Patent No.: US 6,689,181 B2
(45) Date of Patent: Feb. 10, 2004

(54) AMMONIUM SULFATE NITRATE (75) Inventors: Ronald Earl Highsmith, Chesterfield, VA (US); James Alphonse Kweeder, Chester, VA (US); Steven Thomas Correale, Chester, VA (US)

(73) Assignee: Honeywell International Inc., Morristown, NJ (US)

( * ) Notice: Subject to any disclaimer, the term of this patent is extended or adjusted under 35 U.S.C. 154(b) by 147 days.

(21) Appl. No.: 09/970,466

(22) Filed: Oct. 4, 2001

(65) Prior Publication Data

US 2002/0095966 A1 Jul. 25, 2002

Related U.S. Application Data

(60) Provisional application No. 60/248,977, filed on Nov. 15, 2000.

(51) Int. Cl.$^7$ ................................................. C05C 1/00
(52) U.S. Cl. ................................................. 71/59; 71/61
(58) Field of Search ........................................ 71/59, 61

(56) References Cited

U.S. PATENT DOCUMENTS

| | | | | | |
|---|---|---|---|---|---|
| 1,939,165 | A | * 12/1933 | Eissner | ............................ | 71/59 |
| 2,762,699 | A | * 9/1956 | Steinle et al. | .................... | 71/54 |
| 2,795,495 | A | 6/1957 | Schmatloch et al. | ............ | 71/59 |
| 3,282,674 | A | * 11/1966 | Mohr et al. | ................. | 71/64.06 |
| 3,301,658 | A | * 1/1967 | Arthur et al. | ...................... | 71/9 |
| 3,366,468 | A | 1/1968 | Porter | ............................ | 71/35 |
| 3,635,691 | A | * 1/1972 | Earl | ................................. | 71/59 |
| 3,785,796 | A | 1/1974 | Mann, Jr. | ........................ | 71/28 |
| 3,856,269 | A | 12/1974 | Fothergill et al. | ............... | 259/4 |

FOREIGN PATENT DOCUMENTS

| | | | |
|---|---|---|---|
| BE | 388046 | * | 5/1932 |
| BE | 543469 | | 6/1956 |
| DE | 1039498 | | 9/1958 |
| DE | 2355660 A1 | | 5/1975 |
| DE | 2355660 | * | 5/1975 |
| DE | 3446787 | | 7/1986 |
| FR | 1368035 | | 6/1964 |
| GB | 349998 | | 5/1931 |
| GB | 372388 | | 5/1932 |
| GB | 798690 | | 7/1958 |
| GB | 893389 | | 4/1962 |
| GB | 1049782 | * | 8/1963 |
| GB | 1119702 | * | 10/1965 |
| GB | 1259778 | * | 1/1972 |
| PL | 85766 | | 9/1976 |
| SE | 70119 | 10/1930 | ........................ 16/6 |
| WO | WO 99/61395 A1 | 12/1999 | ........... C06B/31/28 |

OTHER PUBLICATIONS

Smith et al., J. Agric. Fod Chem, vol. 10, pp. 77–78, 1962.*
Title 49, Code of Federal Regulations, Part 172, "Hazardous Materials Table", Oct. 1, 2000 United Nations Recommendations on the Transport of Dangerous Goods, Manual of Tests and Criteria, 1995, "Section 34, Classification Procedures, Test Methods and Criteria Relating to Oxidizing Substances of Division 5.1".
R.L. Snyder, "The Use of Reference Intensity Ratios in X–Ray Quantitative Analysis", *Powder Diffraction*, 7(4) 186–193(1992).
Emons et al., "Dampfdruckmessungen im System Ammonnitrat–Ammonsulfat–Wasser", *Wissenshaftliche. Zetschrift Techn. Hocksch. Chem Leuna–Merseburg*, 14(3), 295–299 (1972).
J. Turlej, "Manufacturing Methods, Chemical and Physical Characteristics of Ammonium Sulfate Nitrate Fertilizer," *Prz. Chem*, 55(12), 611–614 (1976).
Srinivasa et al., "X–Ray Study on the Stability of Ammonium Nitrate–Sulfate", *Technology*, 6(1), 21–23 (1969).
Naoum et al., "Ueber Exploffionsfähigkeit und Exploffionsbedingungen von Ammonialpeter und Gemifchen desielben mit andern Salzen",*Zeit. Fur das Gesamte Sceiss. Und Sprengstoff*, 19, 35–38 (1924).
R.S. Meline, "Plant—Scale Production of Fertilizers in a Pan Granulator" ,*J.Agric.Food. Chem.*, 16(2) 235–240 (1968).
Nikonova et al., *Zhurnal Prikaladnoi Khimii*, 15(6), 437–446 (1942).
Itoh, "Equilibrium of the $(NH_4)_2SO_4–NH_4NO_3–NH_4SO_3NH_2–H_2O$ System at 25°", *Kogyo Kagaku Zasshi*, 63(11), 1913–1916 (1960).
Smith et al., Crystallographic Properties of the Ammonium Nitrate–Sulfates 3 $NH_4NO_3(NH_4)_2SO_4$ and 2 $NH_4NO_3(NH_4)_2SO_4$, *J. Agr. Food Chem*, 10, 77–78 (1962).

* cited by examiner

*Primary Examiner*—Chhaya Sayala
(74) *Attorney, Agent, or Firm*—Margaret S. Millikin (57) ABSTRACT

Ammonium sulfate nitrate composite materials useful as fertilizers having desirable levels of nitrate ions, superior stability against detonation, higher density, greater resistance to moisture, and a method for their manufacture. The ammonium sulfate nitrate composites have as essential constituents ammonium sulfate and the $NH_4SO_4.2(NH_4NO_3)$ double salt with less than 5 wt. % in combined total of the more hazardous $NH_4SO_4.3(NH_4NO_3)$ double salt and ammonium nitrate.

23 Claims, 7 Drawing Sheets

AMMONIUM SULFATE NITRATE

CROSS-REFERENCES TO RELATED APPLICATIONS

This application claims the benefit of provisional application Ser. No. 60/248,977 filed Nov. 15, 2000.

BACKGROUND OF THE INVENTION

1. Field of the Invention

The present invention relates to ammonium sulfate nitrate composites useful as fertilizers having desirable levels of nitrate ions, superior stability against detonation, higher density, greater resistance to moisture, and a method for their manufacture.

2. Description of the Related Art

Ammonium sulfate nitrate (ASN), one of the first synthetic fertilizers, has been in continuous use for nearly 100 years providing the important primary and secondary nutrients, nitrogen and sulfur. Nitrogen is provided in part through the nitrate ion, desirable because it is readily adsorbed by many plants and promotes early growth. As historically used, the term "ammonium sulfate nitrate" has not referred to a specific chemical compound with elements in fixed proportions. Rather, it has been used to describe various mixtures of ammonium nitrate and ammonium sulfate. The Association of American Plant Food Officials (AAPFCO), which has assumed the role of monitoring and defining fertilizers, has attempted to bring order to the nomenclature. APPFCO has defined ASN as a double salt of ammonium sulfate and ammonium nitrate in equal molar proportions having a nitrogen content not less than 26%. An equal molar mixture of ammonium sulfate and ammonium nitrate has a nitrogen content of 26.4%.

Despite the AAPFCO definition, the name, ammonium sulfate nitrate, has been used to designate many combinations of ammonium sulfate and ammonium nitrate. See for instance, R. S. Meline, *J. Agric. Food Chem.*, 16(2), 235–240 (1968), where one product has a 30% nitrogen content. U.S. Pat. No. 2,795,495 describes ammonium sulfate nitrate as having an ammonium sulfate/ammonium nitrate mole ratio of 1:2 not 1:1. Great Britain Patent No. 798,690 states that the proportion of ammonium sulfate is not critical and may be used in any proportion necessary to obtain the desired nitrogen level. The use of such terminology has led to confusion between pure double salts and mixtures. Additionally, the order of the words, sulfate and nitrate, are sometimes interchanged in the literature.

A double salt is a distinct compound. The AAPFCO definition implies the existence of a compound consisting of one mole of ammonium sulfate and one mole of ammonium nitrate. A few workers have reported such a compound, however, no 1:1 double salt has been isolated and definitively proven to exist. Nikonova et al., *Zhurnal Prikaladnoi Khimii*, 15(6), 437–446(1942) critique and correct the works of earlier authors.

The mere mixing of ammonium sulfate and ammonium nitrate does not result in either a reaction or a reaction to completion. Sufficient conditions, including time, must exist to bring about a complete chemical reaction between the two initial salts. However, even under ideal conditions, the reaction of equal molar proportions of ammonium sulfate and ammonium nitrate does not yield an equal molar compound. Instead, the reaction products are double salts of other proportions mixed with unreacted ammonium sulfate and/or ammonium nitrate.

Double salts consisting of $NH_4SO_4 \cdot 2(NH_4NO_3)$ and $NH_4SO_4 \cdot 3(NH_4NO_3)$ (hereinafter the 1:2 double salt and the 1:3 double salt respectively) have been isolated and confirmed. The 1:3 product was isolated from aqueous solution and reported as early as 1909 (Reicher et al., *Chemish Weekblad.*, 3 (Jan.), 51–56 (1909)). Scheinemakers et al. reported in 1910 in the same publication (Volume 6, 1910, pages 51–56) the isolation of a 1:2 double salt as well as the 1:3 double salt from aqueous solutions. The existence of 1:2 and 1:3 double salts have been confirmed by Nikonova (loc. cit.); Itoh, *Kogyo Kagaku Zasshi*, 63(11), 1913–1916 (1960), Emons et al., *Wissenschaftliche. Zeitschrift Techn. Hocksch. Chem. Leuna-Merseburg*, 14(3), 295–299 (1972); and Smith et al., *J. Agr. Food Chem.*, 10, 77–78 (1962), among others.

Reported manufacturing processes for ammonium sulfate nitrate describe preparation of uniform fertilizer granules. Most products are simply mixtures of ammonium sulfate and ammonium nitrate rather than specific crystal structures since the reported chemical compositions do not reflect any specific compound. An exception is U.S. Pat. No. 2,762,699 that claims a process for the manufacture of the 1:2 double salt.

Crystallization, granulation and prilling manufacturing methods have been reported. GB 798,690 describes a method of crystallization from an aqueous solution of ammonium sulfate and ammonium nitrate. Granulation processes generally employ temperatures below the melting point of ammonium nitrate (170° C.), which assures a product that is incompletely reacted. Examples of granulation processes are described in U.S. Pat. No. 3,635,691, GB 893,389, DE1,039,498, GB 1,259,778, and in the previously mentioned journal article by R. S. Meline, et. al. Prilling processes involve temperatures above the melting point of ammonium nitrate (170° C.). Examples are described in Polish Patent No. PL86,766, and in *Przem. Chem.*, 55(12), 611–614 (1976). A small amount of water was added to facilitate the melting of the nitrate. Swedish Patent 70,119 describes a process using up to 10% water with a charge consisting of ammonium sulfate and ammonium nitrate in molar ratio of 0.6:1 and prilling immediately after melting.

Few details on the composition of the products from these processes have been reported. Most of these, if not all, are mixtures consisting of double salts, ammonium sulfate, and ammonium nitrate.

It is clear from many literature references that the products of these processes suffered from low crush strength, adsorption of humidity, and caking. For instance, French Patent No. 1,368,035 stated that ammonium sulfate nitrate fertilizer possessed problems with stability in storage. Belgian Patent No. 388,046 listed several methods that utilized additives to reduce these problems. The susceptibility to caking from absorption of humidity was addressed by adding amphoteric metal oxides. U.S. Pat. No. 2,795,495 described a process to improve the stability of ammonium sulfate nitrate by adding iron salts followed by exposure to ammonia. GB 1,259,778 described a composition incorporating aluminum hydroxide or an aluminum salt to obtain improved anti-caking properties. GB 372,388 improved stability by adding urea and magnesium salts.

J. Turlej, *Prz. Chem*, 55(12), 611–614 (1976) described efforts that various manufacturers adopted to improve ammonium sulfate nitrate anti-caking stability. BASF, currently the largest producer, reportedly added aluminum, magnesium, and/or calcium compounds. Ruhrchemie added ferrous sulfate.; Victor-Chemische added ferrous sulfate; Uhde Hebernia added ferrous sulfate and phanolite, a mineral. SBA (Belgium) added certain other substances. Turlej's own work, reported in the same journal, showed the addition of dolomite, aluminum, and/or magnesium compounds to increase stability and eliminate caking.

Several references have reported that ammonium sulfate nitrate always has unreacted starting materials. I. G. Farbenindustries reported in DE. 555,581 and DE 555,902 that free ammonium nitrate is always present. Srinivasa, et al. reported in *Technology*, 6(1), 21–23 (1969) that the product always contains free ammonium nitrate. Ammonium nitrate is known to be very hygroscopic and it likely contributed to caking problems and particle weakness.

Ammonium nitrate mixed with organic materials such as fuel oil is an important industrial explosive. It has also been linked to terrorist incidents such as the New York World Trade Center and Oklahoma City bombings. It is desirable to render ammonium nitrate less sensitive to detonation. One way to do that is to dilute ammonium nitrate with a relatively inert material. U.S. Pat. No. 3,366,468, 1968, claimed that 5 to 10% of additives such as ammonium phosphates or ammonium sulfate could desensitize and render ammonium nitrate resistant to flame and detonation. However, the pure ammonium sulfate-ammonium nitrate double salts should also be considered as potential explosive materials because the oxygen to nitrogen ratio is favorable for oxidation reactions.

Naoum et al., *Zeit. fur das Gesamte Sceiss. Und Sprengstoff.*, 19, 35–38(1924) reported the heat of explosion (reaction) of ammonium nitrate and mixtures of ammonium nitrate with ammonium sulfate as a function of composition. The latent energies in 64.5 wt. % and 54.8 wt. % mixtures of ammonium nitrate, corresponding to the 1:3 and 1:2 double salts, were 81% and 76% respectively of the explosive energy of pure ammonium nitrate. Data obtained by an independent testing laboratory for Honeywell International show that the 1:3 double salt releases more energy on decomposition than the 1:2 salt. However, Naoun et al. indicate that a completely homogeneous mixture containing less than 40 wt. % ammonium nitrate would probably no longer be explosive. The latent explosive energy was zero at a mole ratio of 1:1 ammonium sulfate/ammonium nitrate (37.7% by weight of ammonium nitrate). Naoum et al., WO 9961395 A1 also showed that the more intimate the mixture of ammonium nitrate and ammonium sulfate, the greater the difficulty of detonation. However, mixtures of ammonium nitrate and large grained ammonium sulfate could produce more gas expansion once detonation was achieved than ammonium nitrate alone. Therefore, an intimate mixture of ammonium nitrate with ammonium sulfate consisting of very small particles is most desirable. Double salts provide intimacy at the molecular level and dispersion at the scale of a few Angstroms. Conditions sufficient for reaction of the ammonium sulfate with the ammonium nitrate maintained for a sufficient period react the ammonium nitrate near completely to the double salts. Such reaction, if carried out with sufficient molar excess of ammonium sulfate, results in a complete or near-complete conversion to the safer 1:2 double salt.

Ammonium sulfate nitrate materials are currently manufactured and sold by BASF and Fertiberia. X-ray diffraction analysis of the BASF material shows a composition consisting on average of 27 wt. % ammonium sulfate, 1 wt % of the 1:2 double salt and 72 wt. % of the 1:3 double salt. The Fertiberia material is 29 wt. % ammonium sulfate, 35 wt. % of the 1:2 double salt and 36 wt. % of the 1:3 double salt. These products appear to be made by a granulation process. The granules are inhomogeneous surface-to-core.

Nutrient value and safety and stability of ammonium sulfate nitrate compositions are competitive properties. Nutrient value increases with increased nitrate content but so also does sensitivity to detonation and sensitivity to moisture. In view of the high penalty for detonation, it is seen that the balance between these properties must be struck where safety is assured. The foregoing considerations lead to the view that what is needed, is an ammonium sulfate nitrate product containing the maximum nitrate content consistent with non-hazardous properties.

SUMMARY OF THE INVENTION

The present invention provides a non-explosive ammonium sulfate nitrate composite material comprising by x-ray diffraction analysis about 14 wt. % to about 35 wt. % ammonium sulfate ($(NH_4)_2SO_4$); about 60 wt. % to about 85 wt. % $(NH_4)_2SO_4 \cdot 2(NH_4NO_3)$ double salt; and 0 to about 5 wt. % in combined total $(NH_4)_2SO_4 \cdot 3(NH_4NO_3)$ double salt and ammonium nitrate ($NH_4NO_3$). The composites are useful as fertilizers, have reduced moisture sensitivity, are not considered hazardous materials under Title 49 of the Code of Federal Regulations, "Transportation", Part 172, "Hazardous Materials Table", Oct. 1, 2000, and are not classified as oxidizers under United Nations Recommendations on the Transport of Dangerous Goods, Manual of Tests and Criteria, 1995", "Section 34, Classification Procedures, Test Methods and Criteria Relating to Oxidizing Substances of Division 5.1".

The invention also provides a method for the production of ammonium sulfate nitrate composite materials comprising the steps of: (a) charging materials comprising ammonium sulfate particles, ammonium nitrate and water to a melting device, wherein the molar ratio of ammonium sulfate to ammonium nitrate is about 0.9:1 to about 1.1:1 and the water is more than 2 wt. % to about 10 wt. % of the charged materials; (b) melting the ammonium nitrate and dissolving at least a portion of the ammonium sulfate particles at a temperature of about 180° C. to about 210° C.; (c) reacting the charged materials at a temperature of about 180° C. to about 210° C.; and (d) solidifying the product at a cooling rate of at least about 100° C./min.

The invention also includes an ammonium sulfate nitrate composite material prepared by the process comprising the steps of: (a) charging materials comprising ammonium sulfate particles, ammonium nitrate and water to a melting device, wherein the molar ratio of ammonium sulfate to ammonium nitrate is about 0.9:1 to about 1.1:1 and the water is more than 2 wt. % to about 10 wt. % of the charged materials; (b) melting the ammonium nitrate and dissolving at least a portion of the ammonium sulfate particles at a temperature of about 180° C. to about 210° C.; (c) reacting the charged materials at a temperature of about 180° C. to about 210° C.; and (d) solidifying the product at a cooling rate of at least about 100° C./min.

BRIEF DESCRIPTION OF THE DRAWINGS

In the accompanying drawing figures:

FIGS. 1–3 show Cu $K\alpha_1$ x-ray diffraction scans for an ammonium sulfate nitrate composite material comprising by x-ray diffraction analysis, 7.6 wt. % ammonium sulfate, 42.4 wt. % $(NH_4)_2SO_4 \cdot 2(NH_4NO_3)$, 45.7 wt. % $(NH_4)_2SO_4 \cdot 3(NH_4NO_3)$ and 4.3 wt. % ammonium nitrate.

DETAILED DESCRIPTION OF THE INVENTION

The present invention provides an ammonium sulfate nitrate composite material comprising by x-ray diffraction analysis about 14 wt. % to about 35 wt. % ammonium sulfate (($NH_4)_2SO_4$); about 60 wt. % to about 85 wt. % ($NH_4)_2SO_4 \cdot 2(NH_4NO_3)$ double salt; and 0 to about 5 wt. % in combined total ($NH_4)_2SO_4 \cdot 3(NH_4NO_3)$ double salt and ammonium nitrate ($NH_4NO_3$). Preferably, the ammonium sulfate nitrate composite material, by x-ray diffraction analysis, consists essentially of about 14 wt. % to about 35 wt. % ammonium sulfate (($NH_4)_2SO_4$); about 60 wt. % to about 85 wt. % ($NH_4)_2SO_4 \cdot 2(NH_4NO_3)$ double salt; and 0 to about 5 wt. % in combined total ($NH_4)_2SO_4 \cdot 3(NH_4NO_3)$ double salt and ammonium nitrate ($NH_4NO_3$).

Preferably the combined total of ($NH_4)_2SO_4 \cdot 3(NH_4NO_3)$ double salt and ammonium nitrate ($NH_4NO_3$) in the ammonium sulfate nitrate composite material of the invention is 0 to about 3 wt. %. More preferably, the ammonium nitrate ($NH_4NO_3$) is about 0 to 1 wt. %.

The term "double salt" as used herein means a chemical compound composed of ions from two precursor compounds whose crystal structure is distinct from those of the precursor compounds. The molar ratio of precursor compounds in a double salt is in the proportion of small integers, e.g., 1:2, and is not continuously variable as in a solid solution.

The composite product of the invention consists of small ammonium sulfate crystals imbedded in a matrix of the other constituents. The composite material of the invention is to be distinguished from a mixture of free particles. The bulk of the ammonium sulfate crystals are approximately the same size as the initial ammonium sulfate particles, but upon solidification about 5 wt. % precipitate as crystals of less than about 2 micrometer dimension. The crystals of ammonium sulfate are dispersed in the matrix in a uniform manner. The small size and uniform dispersion of the ammonium sulfate crystals in the 1:2 double salt significantly enhance the stability of the product against detonation hazard.

Less than about 5 wt. % of the product consists of the hazardous ammonium nitrate or 1:3 double salt species. The composites of the invention are useful as fertilizers, have reduced moisture sensitivity, are not considered hazardous materials under Title 49 of the Code of Federal Regulations, "Transportation", Part 172, "Hazardous Materials Table", Oct. 1, 2000, and are not classified as oxidizers under United Nations Recommendations on the Transport of Dangerous Goods, Manual of Tests and Criteria, 1995", "Section 34, Classification Procedures, Test Methods and Criteria Relating to Oxidizing Substances of Division 5.1".

The ammonium sulfate and the ammonium nitrate used to form the composites of the invention are fertilizer grade materials of at least about 90 wt. % purity. Preferably, the ammonium sulfate and the ammonium nitrate are of at least about 95 wt. % purity. More preferably, the ammonium sulfate and ammonium nitrate are of at least 97 wt. % purity. Because of the hazards of mixing organic materials with ammonium nitrate, it is highly desirable that neither the ammonium sulfate nor the ammonium nitrate contains more than about 0.2 wt. % organic impurities. One example of ammonium sulfate useful in the invention is commercially available from Honeywell International Inc.

The particle size of the ammonium nitrate is not critical but preferably, about 95 wt. % of the ammonium nitrate particles pass a Tyler No. 6 sieve (3.36 mm opening).

The particle size of the ammonium sulfate is important to achieving the objectives of the invention. Generally, the smaller the particle, the more rapid the reaction between the ammonium sulfate and ammonium nitrate and the finer will be the scale of their dispersion. It is preferred that the ammonium sulfate is at least about 85 wt. % passable through a Tyler No. 48 sieve (0.30 mm opening). Ammonium sulfate subjected to commercial ball milling typically meets this criterion without additional screening. More preferably, the ammonium sulfate is about 99 wt. % passable through a Tyler No. 48 sieve. Most preferably, the ammonium sulfate is about 99 wt. % passable through a Tyler No. 48 sieve and about 50 wt. % passable through a Tyler No. 200 sieve (0.074 mm opening).

The composites of the invention are formed by reacting ammonium sulfate with ammonium nitrate in a molar ratio of about 0.9:1 to about 1.1:1 in the presence of a small amount of water in a narrow range of temperatures and then cooling to solidification at a sufficiently rapid rate to prevent macroscopic segregation of the reaction products. It is found that at cooling rates less than about 100° C./min, phase separation tends to occur. The method of the invention comprises the steps of: (a) charging materials comprising ammonium sulfate particles, ammonium nitrate and water to a melting device, wherein the molar ratio of ammonium sulfate to ammonium nitrate is about 0.9:1 to about 1.1:1 and the water is more than 2 wt. % to about 10 wt. % of the charged materials; (b) melting the ammonium nitrate and dissolving at least a portion of the ammonium sulfate particles at a temperature of about 180° C. to about 210° C.; (c) reacting the charged materials at a temperature of about 180° C. to about 210° C.; and (d) solidifying the product at a cooling rate of at least about 100° C./min.

Preferably, the method of the invention is carried out in a continuous process.

In another embodiment, the invention includes an ammonium sulfate nitrate material prepared by the process comprising the steps of: (a) charging materials consisting essentially of ammonium sulfate particles, ammonium nitrate and water to a melting device, wherein the molar ratio of ammonium sulfate to ammonium nitrate is about 0.9:1 to about 1.1:1 and the water is more than 2 wt. % to about 10 wt. % of the charged materials; (b) melting the ammonium nitrate and dissolving at least a portion of the ammonium sulfate particles at a temperature of about 180° C. to about 210° C.; (c) reacting the charged materials at a temperature of about 180° C. to about 210° C.; and (d) solidifying the product at a cooling rate of at least about 100° C./min.

The range of melting and reaction temperatures are limited by the need to melt the ammonium nitrate and also by the need to minimize its decomposition. Preferably, the melting and reaction temperatures are about 190° C. to about 205° C. More preferably, the melting and reaction temperatures are about 190° C. to about 200° C.

The time provided for the reaction between the ammonium sulfate and the ammonium nitrate is not critical provided that sufficient time is provided for dissolution of the ammonium sulfate. The rate-limiting step is believed to be the dissolution of the ammonium sulfate in the ammonium nitrate melt. Necessary dissolution times will be lower with finer particles of ammonium sulfate, with vigorous agitation of the melt, and with temperatures at the higher end of the permissible range It is preferred for agricultural purposes that the products of the invention are in the form of free-flowing prills. It is preferred that step d) of the method of the invention, soldifying the product at a cooling rate of at least about 100° C./min, be conducted in a prilling tower. The cooling rate will be greater with smaller drop sizes, and lower air temperatures in the prilling tower. Preferred is the prilling process described by co-pending application Ser. No. 09/468,668, filed Dec. 12, 1999, hereby incorporated by reference to the extent not incompatible herewith.

The water is an essential constituent of the reaction mixture. Surprisingly, there appears to be an abrupt change in the proportions of 1:2 and 1:3 double salts in the product when the water content of the charge exceeds about 2 wt. %. When the water is less than about 2 wt. % of the charged materials, the more hazardous 1:3 double salt is formed in preference to the desired 1:2 double salt and more ammonium nitrate remains unreacted. It is preferred that the water content is more than 2 wt. % to about 5 wt. %. of the charged materials. More preferably, the water content is about 2.5 wt. % to about 4 wt. % of the charged materials.

The manner in which the water is charged to the reaction mixture is not critical. The water may be charged as a liquid, or it may be incorporated in the ammonium sulfate, the ammonium nitrate, or both, as absorbed moisture.

It was also surprising to find that the residual water in the product after fusion and cooling was proportional to the initial amount of water even though in some examples the molten charge had been held at 200° C. for more than an hour with stirring. The concentration of the residual water was also surprisingly high considering the high vapor pressure of water at 200° C. Most of the added water probably evaporates rapidly, however the final proportions of the double salts are highly related to the concentration of water remaining in the product.

Another surprising effect of water was found. At the temperatures employed in fusion, water would presumably create bubbles (voids) resulting in lower density. Contrary to expectations, the density of the product increased as residual water increased.

Without being held to a particular theory of why the invention works, it is hypothesized that the ammonium sulfate in an equal molar mixture of ammonium sulfate and ammonium nitrate is incompletely soluble in the molten ammonium nitrate in the absence of water. This limits the reaction of the ammonium sulfate with the ammonium nitrate, tends to leave residual ammonium sulfate and therefore favors the formation of the higher nitrate 1:3 double salt. When water is added to the charge, it is believed that ammonium sulfate solubility in the molten ammonium nitrate is enhanced, thereby favoring complete reaction of the ammonium nitrate with the ammonium sulfate and the formation of the 1:2 double salt.

The composite products of the invention are analyzed by powder x-ray diffraction (XRD) to determine the proportions of ammonium sulfate, ammonium nitrate, 1:2 and 1:3 double salts. The data in the examples were collected with a Phillips APD 1700 x-ray diffraction system with the following characteristics.

XRD INSTRUMENTATION

Sealed tube XRG 3100 generator with Cu target operating at 50 kV, 40 mA.
Vertical diffractometer in a parafocus geometry.
Variable incident slit (theta compensating).
Curved graphite monochromator in the diffracted beam set for Cu K$\alpha$.
0.2° receiving slit.
Sealed xenon proportional counter.
Automatic sample changer.
PC-APD software.

The samples and standards for XRD analysis were milled to a particle size of less than 40 $\mu$m using a 8000 SPEX Mill, Wig-L-Bug mill or mortar and pestle and then back loaded into sample holders. The small particle size and backloading were employed to minimize any effects due to preferred orientation or microabsorption.

The identification of the compounds and their diffraction peaks were made using a search match routine and the powder diffraction database of the International Centre For Diffraction Data (ICDD), Newton Square, Pa. The initial scans of the reference materials and their mixes with an alumina standard were collected from 5° to 85° 2θ, using 0.02° 2θ step size with 1 sec counting times.

The diffraction scans were profile-fitted using the routine supplied with the Philips software. The profile fit routine used a Marquardt non-linear least squares algorithm, a Voigt peak profile, and a linear background. The fit results for each diffraction peak consisted of its 2θ peak position for Cu K$\alpha_1$ using $\lambda$=1.54056 Å, full-width at half-maximum (FWHM) of the K$\alpha_1$ peak component, peak height of the K$\alpha_1$ peak component, the area of the K$\alpha_1$ peak component, and the total peak area, which includes contribution from both the Cu K$\alpha_1$ and K$\alpha_2$ wavelengths. The FWHM were not corrected for instrumental broadening.

The quantitative analyses were performed using the profile-fitted peak height and area of selected diffraction peaks for each compound and Reference Intensity Ratios (RIR). The RIR of the compounds were determined by measuring the ratio of their intensities to those of an internally mixed, certified alumina standard, NBS 674a, from NIST, using both variable slit and calculated fixed slit intensities, containing known proportions of the phase and the alumina. The mixes of ammonium sulfate, ammonium nitrate, and the double salts with alumina were prepared in weight ratios of 25/75, 50/50, and 75/25. The x-ray scans for the RIR determination were made from 5° to 45° 2θ with 0.02° 2 step size.

The RIR for the ammonium nitrate was obtained using ACS Grade ammonium nitrate as certified from Fisher Scientific. The ammonium sulfate used for the RIR determination was a commercially available material from the Honeywell International Inc., Hopewell Va. plant of about 98 wt. % purity. The standards used for determining the RIR values for the 1:2 and 1:3 double salts were made by crystallization and corrected for the impurities in the samples. The 1:2 standard contained 16.7% ammonium sulfate. The 1:3 standard contained an estimated 1–2% ammonium sulfate and about 3% ammonium nitrate.

Most of the peaks in the scans from these mixes were fitted between 15° and 45° 2θ. For each phase, the relative intensities (in %) of its diffraction peaks were determined experimentally against its most intense peak. The relative intensities for each phase were calculated for the three intensity parameters: the K$\alpha_1$ peak height, K$\alpha_1$ peak area, and total peak area, using the average of intensities from the pure analyte standard and its mixes with the alumina. The relative intensities of the alumina peaks were determined for each phase using averaged intensities from the pure alumina and its mixes with that phase.

In the literature, relative intensities of a XRD pattern and its RIR are reported based on fixed slit intensities. Since the experimental intensities were collected using variable slit, fixed slit intensities were calculated using:

$$I(fixed) = I(variable)/\sin\theta$$

In general, the three most intense peaks for each phase were used for determining the RIR. For each mix the intensities from the peaks were normalized using their relative intensity. The average of these normalized intensities for the analyte phase and the alumina, I(a) and I(s) respectively were then used in the RIR calculation:

$$RIR(a) = \frac{X(s)I(a)}{X(a)I(s)}$$

where, X(s)=the weight fraction of the alumina

X(a)=the weight fraction of the analyte phase.

The RIRs from the set of mixes were then averaged and a standard deviation was determined. RIRs were determined for both variable slit and fixed slit and for all 3 intensity parameters: $K\alpha_1$ peak heights, $K\alpha_1$ peak area, and total peak area.

Table I shows the diffraction peaks used for determination of the RIRs and their relative intensities. Table II shows the average RIR values so determined and their standard deviations.

Figure 1:
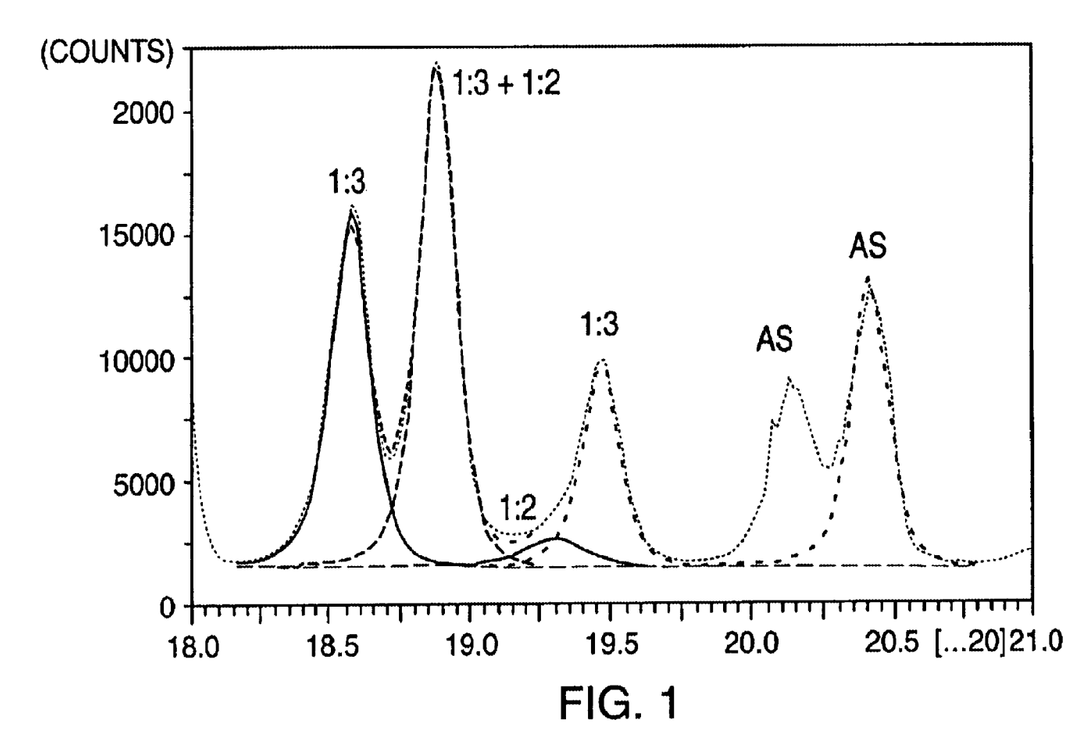
FIG. 1 shows the x-ray diffraction scan for said ammonium sulfate nitrate composite material in the angular range 18.2° to 21° 2θ.
Figure 2:
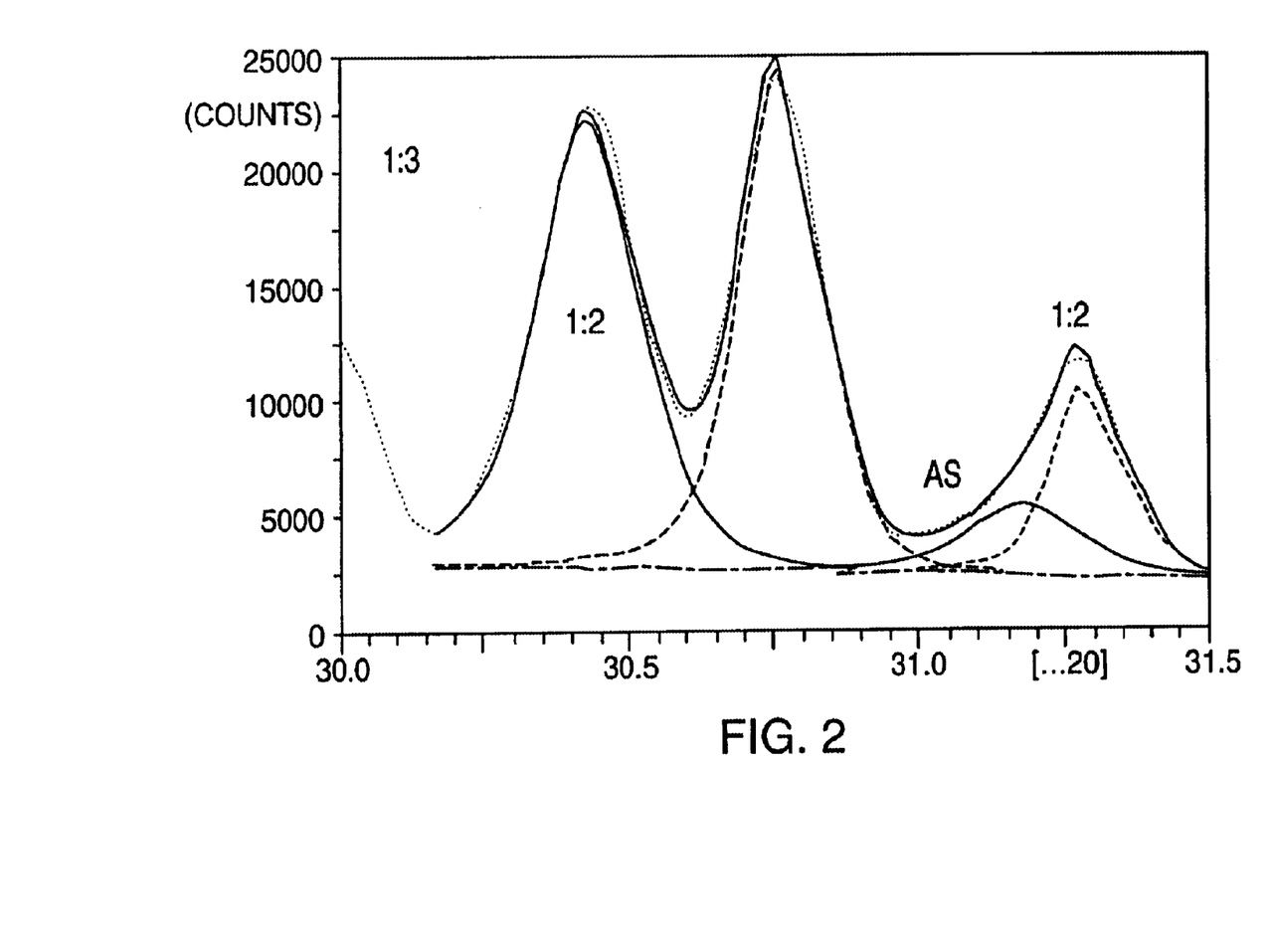
FIG. 2 shows the Cu $K\alpha_1$ x-ray diffraction scan for said ammonium sulfate nitrate composite material in the angular range 30.40° to 31.8° 2θ.
Figure 3:
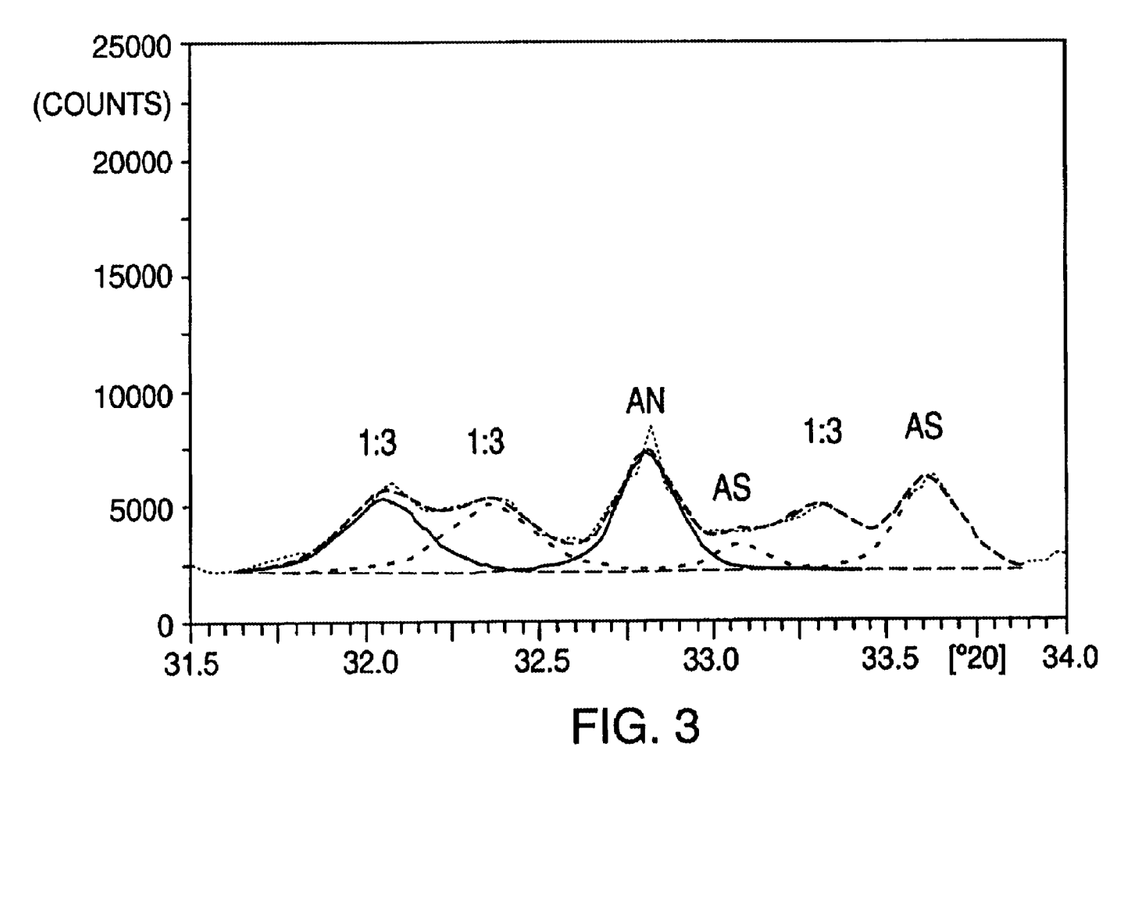
FIG. 3 shows the Cu $K\alpha_1$ x-ray diffraction scan for said ammonium sulfate nitrate composite material in the angular range 31.8° to 33.8° 2θ.

Since the products of the examples were 100% crystalline and all the phases were known along with their RIR, it was not necessary to mix samples with a standard. Instead, the products of the examples were measured directly and the weight fractions calculated using the "Matrix Flushing" ("Normalized RIR") method (R. L. Snyder, *Powder Diffraction*, 7(4) 186–193(1992)). In the matrix flushing method the weight percent of the $a^{th}$ phase in a mix of n phases using normalized intensities, are calculated using the following relationship:

$$X(a) = \frac{I(a)}{\left[ RIR(a) \cdot \sum_j \frac{I(j)}{RIR(j)} \right]}$$

where the summation is over j=1 to n phases.

which phases were present. The second data file was fitted in 2 ranges: 30.4° to 31.8° 2θ and 31.8° to 33.8° 2θ. In the 30.4° to 31.8° 2θ range up to 4 peaks were found and in the 31.8° to 33.8° 2θ range up to 6 peaks were possible. FIGS. 1, 2, and 3 illustrate the diffraction scans and fitted peaks for a sample prepared by mixing the (impure) 1:2 and 1:3 standards described above in equal proportions.

The fit results were entered in an EXCEL spreadsheet created for this analysis. Based on the relative peak area and FWHM the spreadsheet determined if an individual peak was usable and if a phase was present. The 1:2 peaks at about 30.5° and 30.8° 2θ at low concentration, <5%, were difficult to resolve correctly and usually their FWHM became very large. Therefore, the flag for accepting these peaks was the FWHM had to be <0.25° 2θ. If the FWHM for the 1:2 peak at about 30.5° was >0.25, then the goodness of fit of the 1:3 peak at 30.8° was in question and was flagged as being unacceptable.

The spreadsheet then normalized the peak intensities, averaged the normalized intensities for each phase, and calculated the weight percent of each phase using $K\alpha_1$ peak heights, $K\alpha_1$ peak area, total peak area, and reported the average weight percent from the three calculations.

An example of this procedure for the diffraction scans illustrated in FIGS. 1–3 is shown in the worksheet of Table III. It is seen that the sample was determined by x-ray

TABLE I

| Alumina NBS 674 | | | Ammonium Sulfate ICDD Card: 40-660 | | | Ammonium Nitrate ICDD Card: 47-0867 | | | $(NH_4)_2SO_4.2(NH_4NO_3)$ ICDD Card :None[2] | | | $(NH_4)_2SO_4.3(NH_4NO_3)$ ICDD Card: 20-100 | | |
|---|---|---|---|---|---|---|---|---|---|---|---|---|---|---|
| Hkl | 2θ | Relative Intensity | hkl | 2θ | Relative Intensity | hkl | 2θ | Relative Intensity | hkl | 2θ | Relative Intensity | hkl[1] | 2θ | Relative Intensity |
| 120 | 25.58 | 55.4 | 120 | 20.20 | 49 | 011 | 22.47 | 46 | | 26.95 | 43 | | 27.31 | 55 |
| 104 | 35.13 | 87.4 | 100 | 20.47 | 100 | 111 | 28.92 | 100 | | 27.18 | 100 | | 28.04 | 100 |
| 113 | 43.36 | 100 | 200 | 22.83 | 33 | 020 | 32.90 | 64 | | 30.50 | 47 | | 30.81 | 50 |

[1]Card data was not indexed.
[2]None of the existing card files exactly matched the experimental data.

TABLE II

| Intensity | Ammonium Sulfate | | Ammonium Nitrate | | $(NH_4)_2SO_4.3(NH_4NO_3)$ | | $(NH_4)_2SO_4.2(NH_4NO_3)$ | |
|---|---|---|---|---|---|---|---|---|
| Parameter | RIR | Std. Dev. | RIR | Std. Dev. | RIR | Std. Dev. | RIR | Std. Dev. |
| Variable slit | | | | | | | | |
| $K\alpha1$ Peak Height | 0.866 | 0.027 | 0.912 | 0.056 | 0.534 | 0.023 | 0.368 | 0.033 |
| $K\alpha1$ Peak Area | 0.717 | 0.010 | 0.737 | 0.051 | 0.503 | 0.009 | 0.401 | 0.021 |
| Total Peak Area | 0.724 | 0.006 | 0.714 | 0.050 | 0.508 | 0.008 | 0.381 | 0.027 |
| Fixed Slit | | | | | | | | |
| $\alpha1$ Peak Height | 1.789 | 0.055 | 1.337 | 0.090 | 0.813 | 0.035 | 0.578 | 0.052 |
| $\alpha1$ Peak Area | 1.481 | 0.021 | 1.090 | 0.075 | 0.767 | 0.013 | 0.630 | 0.033 |
| Total Peak Area | 1.497 | 0.013 | 1.057 | 0.740 | 0.773 | 0.013 | 0.599 | 0.042 |

The highest intensity peaks for the several species could not be used for the quantitative analysis as there was considerable overlap between them. Less intense diffraction peaks with little or no overlap were used and normalized based on their relative peak heights. The intensities used in the above equation were an average of normalized intensities from multiple peaks.

The diffraction data for the quantitative analysis were collected using two scans. The first scan was between 18° and 21° 2θ with 0.02° 2θ step size, 8 sec/step. The second scan was collected from 30° to 34° 2θ with 0.02° 2θ step size, 8 sec/step. Total data collection time was 48 min per sample and generated two files per sample.

The first data file was fitted in the range between 18.2° and 21° 2θ and consisted of up to 6 peaks, depending on diffraction to be composed of 7.6 wt. % ammonium sulfate, 42.4 wt. % of the 1:2 double salt, 45.7 wt. % of the 1:3 double salt and 4.3 wt. % of ammonium nitrate.

Reproducibility of the XRD method was about ±2%. However, in comparison to material balances between starting materials and products in the examples which follow, the XRD results were on average about 4.8 wt. % too low on overall ammonium sulfate in all species and 5.0% too high on overall ammonium nitrate. Nevertheless, since material balances cannot provide information on the distribution of the species present, the composites of the products of the invention are defined in terms of the XRD analyses by the method described in detail above.

A measure of the crystallite size and perfection (CSP) was determined using the full-width at half-maximum (FWHM)

of selected diffraction peaks, corrected for instrumental broadening, and the Scherrer equation. The crystallite size for the 1:2 double salt was obtained from the average of CSP from two peaks located at about 18.9° and 31.3° 2θ. The crystallite size for the 1:3 double salt was obtained from the average of CSP from two peaks located at about 18.6° and 30.8° 2θ. The CSP for the ammonium sulfate was measured using the (111) peak near 20.5° 2θ.

Analysis of the products of the examples for water content was by the Karl Fischer method.

beaker was placed in an oven at 200° C. until the ammonium nitrate was molten. The beaker was withdrawn from the oven momentarily, thoroughly stirred, and immediately returned to the oven for a period of 30 minutes. Once the ammonium nitrate was molten, at least a portion of the ammonium sulfate dissolved in, and reacted with the ammonium nitrate.

The beaker was withdrawn from the oven and allowed to cool on a lab bench. The beaker was broken open and the product removed as a hard disk. A part of the disk was

TABLE III

Worksheet for Quantitative XRD Analysis

| | | Typical | | Fit Results | | | | | Normalization Factor | | | Normalized Intensity | | | Usable |
|---|---|---|---|---|---|---|---|---|---|---|---|---|---|---|---|
| Fit Range | Phase | Peak Position | Ka1 Position | Ka1 Width | Ka1 height | Ka1 Area | Total Area | Ka1 height | Ka1 Area | Total Area | Ka1 height | Ka1 Area | Total Area | (1=yes) (0=no) |
| 1st Scan | 3:1 | 18.6 | 18.570 | 0.151 | 10467 | 1925 | 2567 | 0.28 | 0.31 | 0.31 | 37382 | 6210 | 8281 | 1 |
| 18.2– 20.9 | 3:1 + 2:1 | 18.9 | 18.886 | 0.133 | 15685 | 2533 | 3628 | 0.1, 0.38 | 0.09, .42 | 0.09, 0.43 | 31439 | 4699 | 6702 | 1 |
| | 3:1 | 19.5 | 19.467 | 0.143 | 6136 | 1064 | 1532 | 0.16 | 0.16 | 0.15 | 38350 | 6650 | 10213 | 0 |
| | AS | 20.2 | 20.141 | 0.161 | 5353 | 1050 | 1499 | 0.45 | 0.64 | 0.64 | 11896 | 1641 | 2342 | 1 |
| | AS | 20.5 | 20.416 | 0.133 | 8925 | 1447 | 2018 | 1 | 1 | 1 | 8925 | 1447 | 2018 | 1 |
| 2nd Scan 1st Fit | 2:1 | 30.5 | 30.417 | 0.178 | 15674 | 3392 | 3505 | 0.52 | 0.62 | 0.61 | 30142 | 5471 | 5746 | 1 |
| | 3:1 | 30.8 | 30.750 | 0.130 | 18658 | 2937 | 4181 | 0.49 | 0.42 | 0.42 | 38078 | 6993 | 9955 | 1 |
| 30.2– 31.8 | 2:1 | 31.3 | 31.285 | 0.114 | 7222 | 997 | 1390 | 0.26 | 0.32 | 0.31 | 27777 | 3116 | 4484 | 1 |
| 2nd Scan 2nd Fit 31.8– 33.8 | AN | 32.8 | 32.796 | 0.161 | 4208 | 823 | 1180 | 0.81 | 0.89 | 0.89 | 5195 | 925 | 1326 | 1 |

| | AS | | | 1:2 | | | 1:3 | | | AN | | |
|---|---|---|---|---|---|---|---|---|---|---|---|---|
| Results | Ka1 height | Ka1 Area | Total Area | Ka1 height | Ka1 Area | Total Area | Ka 1 height | Ka1 Area | Total Area | Ka1 height | Ka1 Area | Total Area |
| RIR (Mean) | 0.866 | 0.717 | 0.724 | 0.367732 | 0.401 | 0.38096 | 0.534 | 0.503 | 0.508 | 0.912 | 0.737 | 0.714 |
| Norm I | 10410 | 1544 | 2180 | 29786 | 4428 | 5644 | 37730 | 6601 | 9118 | 5195 | 925 | 1326 |
| Wt % | 7.1% | 7.8% | 8.0% | 47.8% | 40.1% | 39.4% | 41.7% | 47.6% | 47.7% | 3.4% | 4.5% | 4.9% |
| Average | | 7.6% | | | 42.4% | | | 45.7% | | | 4.3% | |

The following examples are presented to provide a more complete understanding of the invention. The specific techniques, conditions, materials, proportions and reported data set forth to illustrate the principles of the invention are exemplary and should not be construed as limiting the scope of the invention.

EXAMPLES

Comparative Example 1

Ammonium sulfate granules of approximately 1 mm average size were obtained from Honeywell International. The ammonium sulfate was 98 wt. % $(NH_4)_2SO_4$ and contained less than 0.2 wt. % of organic impurities. Forty pounds of this material were ball milled at the Union Process Company, Akron Ohio. At the completion of ball milling, the ammonium sulfate was screened to remove substantially all particles not passable through a Tyler No. 48 sieve. The ground and sieved ammonium sulfate contained about 0.2 wt. % water.

The ammonium nitrate, manufactured by Air Products and sold under the brand name "Ammo Nite®", was of 97 wt. % $NH_4NO_3$ and contained 1.7 wt. % water.

The ammonium sulfate and ammonium nitrate solids were mixed in a small Pyrex beaker in equal molar proportions. The total weight of the charged materials was 10 grams. The broken off and milled to minus 40 micrometer particle size for x-ray diffraction analysis. A few large fragments were analyzed for water content by the Karl Fischer method.

The composition of the product determined by XRD and Karl Fischer analyses is shown in Table IV below. The water in the product had its source in the ammonium sulfate and ammonium nitrate solids. No water had been added to the charge.

Example 2

The same ammonium sulfate and ammonium nitrate as described in Comparative Example 1 were mixed in equal molar proportions. As in Comparative Example 1, the weights of the ammonium sulfate and ammonium nitrate totaled 10 g. However, in this example of the invention, water was added to the solids charged to the beaker. Water constituted 5.45 wt. % of the total charge.

The procedure in this example was identical to that of Comparative Example 1 with the exceptions of adding water to the batch and placing a thermocouple in the beaker as it left the oven to measure its cooling rate. It was found that the cooling rate to solidification of the batch was about 100° C./min. The composite of the product as determined by XRD and Karl Fischer analyses is shown in Table IV.

TABLE IV

| Ex. or Comp. Ex. | Wt. %, (water-free basis) | | | | |
|---|---|---|---|---|---|
| | Ammonium sulfate | $(NH_4)_2SO_4 \cdot 2(NH_4NO_3)$ | $(NH_4)_2SO_4 \cdot 3(NH_4NO_3)$ | Ammonium nitrate | Wt. % Water |
| 1 (Comp.) | 36 | 1 | 52 | 11 | 0.34 |
| 2 | 24 | 69 | 7 | 0 | 0.55 |

It is seen that the inclusion of 5.45 wt. % water in the equi-molar ammonium sulfate-ammonium nitrate mixture had a profound effect on the composition of the product. The water shifted the balance between the 1:3 double salt and the 1:2 double salt to virtually exclude the former in favor of the latter. The residual ammonium nitrate was also markedly reduced.

Examples and Comparative Examples 3–36

A series of ammonium sulfate nitrate materials were prepared using the same ammonium sulfate and ammonium nitrate as described in Comparative Example 1. The parameters varied in this series of batches were the oven temperature, the mole ratio of ammonium sulfate to ammonium nitrate, and the weight percent of water in the charge. Batch size was 10–55 g. The procedure employed was otherwise the same as described in Comparative Example 1.

Table V shows the oven temperatures, the mole ratios of ammonium sulfate (AS) and ammonium nitrate (AN) charged, the weight percents of water charged and the compositions of the products. The data for the water charged included the absorbed water in the ammonium sulfate and the ammonium nitrate and any liquid water additionally added.

Figure 4:
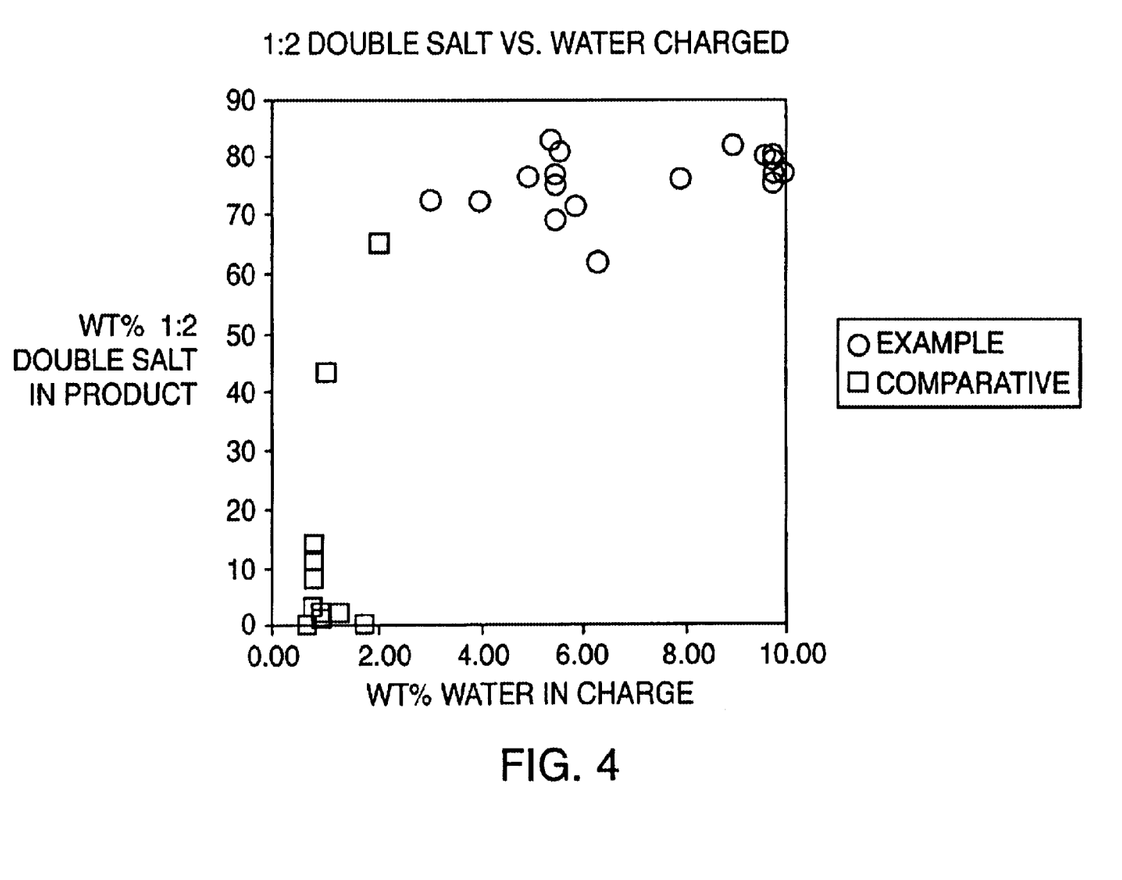
FIG. 4 is a plot showing the relationship between the water in the charge and the percentage of 1:2 double salt in the product.
Figure 5:
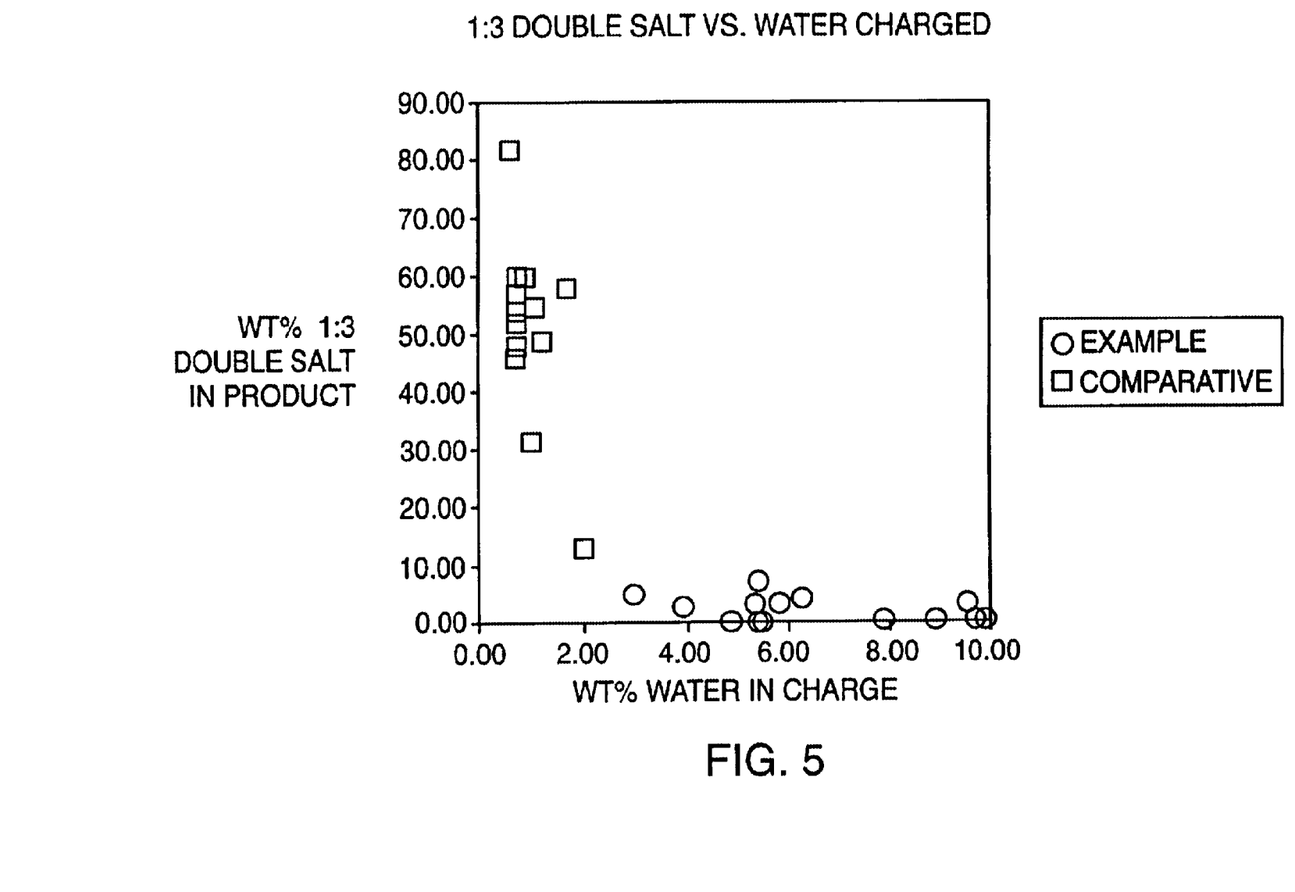
FIG. 5 is a plot showing the relationship between the water in the charge and the percentage of 1:3 double salt in the product.
Figure 6:
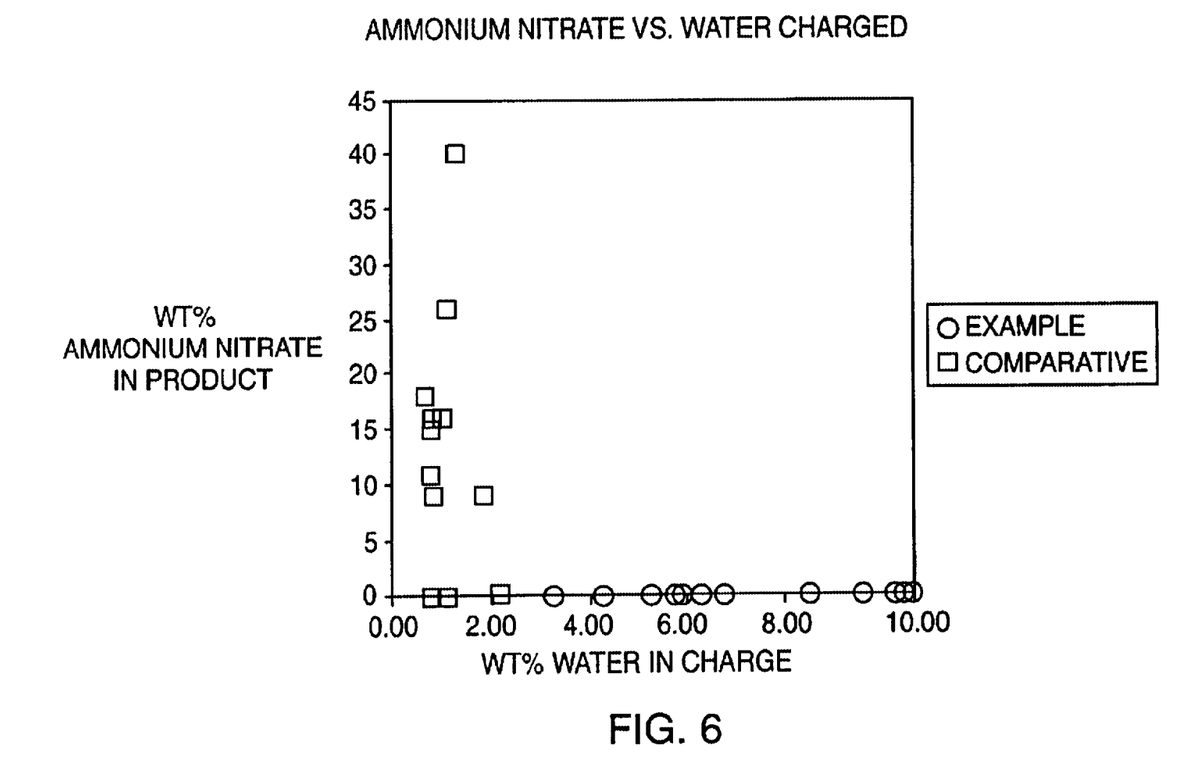
FIG. 6 is a plot showing the relationship between the water in the charge and the percentage of ammonium nitrate in the product.

The product data of Tables IV and V are plotted in FIGS. 4–6 versus the wt. % percent of water in the charge. It will be seen from FIG. 4, that when the water in the charge was increased from about 1 wt. % to 2.3 wt. %, the proportion of the 1:2 double salt increased from about 10 wt. % to more than 60 wt. % of the product. Further, when the water in the charge exceeded about 2 wt. %, the proportions of the 1:3 double salt and the residual ammonium nitrate abruptly decreased to percentages in the single digits or to zero.

Figure 7:
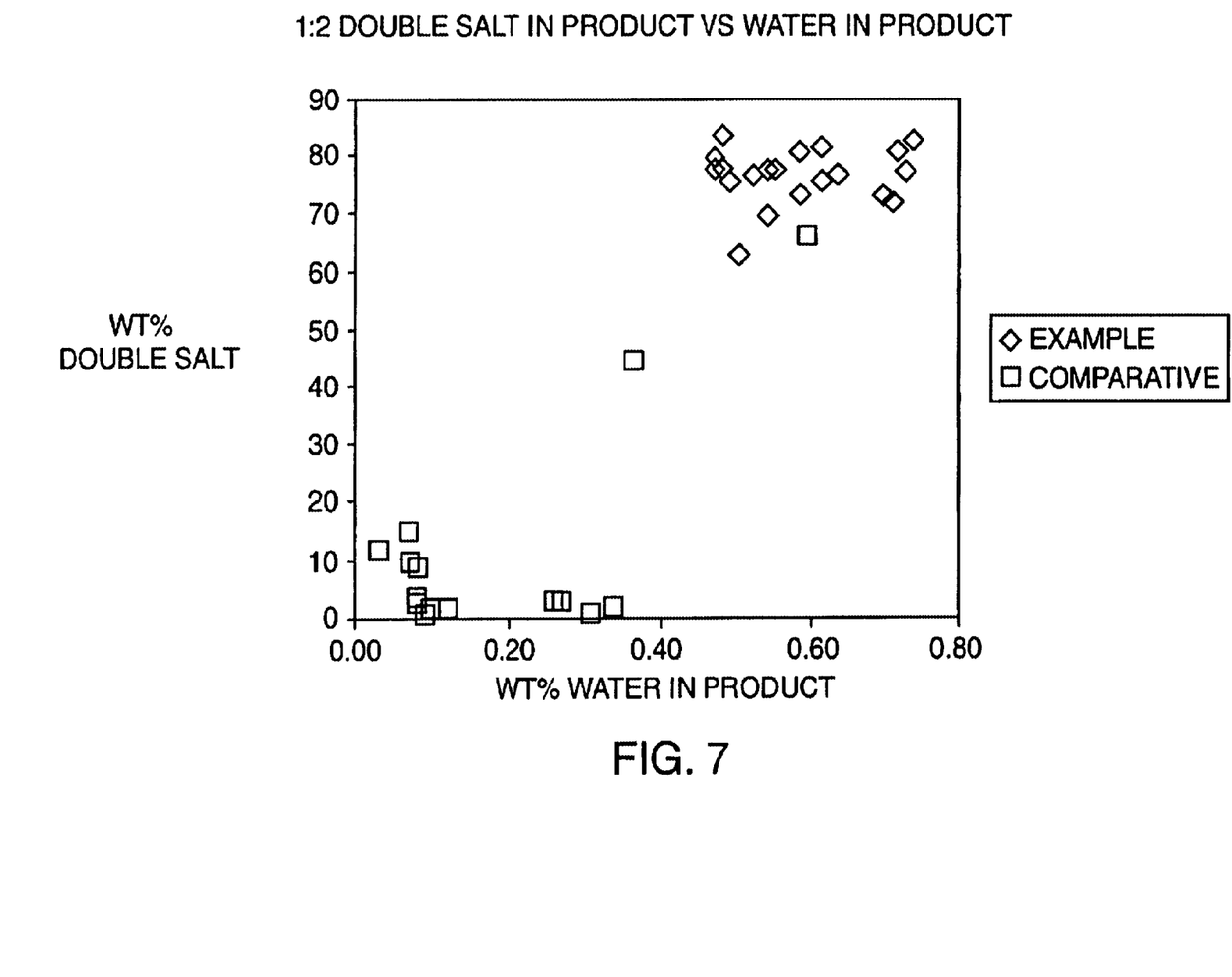
FIG. 7 is a plot showing the relationship between the water in the product, as-formed, and the percentage of 1:2 double salt in the product.

The data of Tables IV and V may also be plotted versus the wt. % of water in the products as formed. FIG. 7 shows that the changes in the product compositions occurred, with one exception, when the residual water in the product, immediately as-formed, exceeded about 0.4 wt. %

TABLE V

| Ex. Or Comp. Ex. No. | Mole Ratio AS/AN Charged | Wt. % Water Charged | Wt. % in Product by XRD (water-free basis) | | | | Wt. % Water in Product |
|---|---|---|---|---|---|---|---|
| | | | AS | $(NH_4)_2SO_4 \cdot 2(NH_4NO_3)$ | $(NH_4)_2SO_4 \cdot 3(NH_4NO_3)$ | AN | |
| T = 180° C. | | | | | | | |
| 3 | 1.001 | 8.93 | 18 | 82 | 0 | 0 | 0.74 |
| 4 | 1.000 | 5.45 | 25 | 75 | 0 | 0 | 0.62 |
| 5 | 1.000 | 9.72 | 24 | 76 | 0 | 0 | 0.53 |
| 6 | 1.002 | 9.72 | 23 | 77 | 0 | 0 | 0.48 |
| 7 | 1.002 | 9.72 | 23 | 77 | 0 | 0 | 0.48 |
| T = 190° C. | | | | | | | |
| 8(Comp.) | 1.000 | 0.76 | 33 | 14 | 53 | 0 | 0.07 |
| 9(Comp.) | 1.000 | 0.76 | 34 | 11 | 55 | 0 | 0.03 |
| 10 | 1.000 | 5.45 | 23 | 77 | 0 | 0 | 0.49 |
| 11 | 1.000 | 9.72 | 25 | 75 | 0 | 0 | 0.50 |
| T = 200° C. | | | | | | | |
| 12 | 1.001 | 6.30 | 34 | 62 | 4 | 0 | 0.51 |
| 13(Comp.) | 1.002 | 1.73 | 33 | 0 | 58 | 9 | 0.31 |
| 14 | 1.002 | 9.72 | 20 | 80 | 0 | 0 | 0.72 |
| 15(Comp.) | 0.944 | 0.78 | 35 | 1 | 48 | 16 | 0.12 |
| 16Comp.) | 1.079 | 0.73 | 37 | 3 | 46 | 15 | 0.08 |
| 17 | 0.944 | 5.37 | 14 | 83 | 3 | 0 | 0.49 |
| 18 | 1.079 | 5.55 | 19 | 81 | 0 | 0 | 0.62 |
| 19 | 0.944 | 9.55 | 17 | 80 | 3 | 0 | 0.59 |
| 20 | 1.079 | 9.92 | 23 | 77 | 0 | 0 | 0.55 |
| 21 | 1.002 | 7.91 | 24 | 76 | 0 | 0 | 0.64 |
| 22(Comp.) | 1.414 | 0.65 | 46 | 0 | 82 | 18 | 0.09 |
| 23(Comp.) | 0.909 | 0.79 | 34 | 2 | 56 | 9 | 0.08 |
| 24(Comp.) | 0.606 | 0.94 | 23 | 1 | 60 | 16 | 0.10 |
| 25(Comp.) | 0.404 | 1.09 | 17 | 2 | 55 | 26 | 0.26 |
| 26(Comp.) | 0.260 | 1.23 | 10 | 2 | 49 | 40 | 0.27 |
| 27(Comp.) | 1.000 | 0.76 | 33 | 9 | 58 | 0 | 0.07 |
| 28(Comp.) | 1.000 | 0.76 | 33 | 8 | 60 | 0 | 0.08 |
| 29 | 1.000 | 5.45 | 23 | 77 | 0 | 0 | 0.56 |
| 30 | 1.000 | 9.72 | 21 | 79 | 0 | 0 | 0.48 |
| 31(Comp.) | 0.999 | 1.34 | 25 | 43 | 32 | 0 | 0.37 |

TABLE V-continued

| | Mole Ratio | | | Wt. % in Product by XRD (water-free basis) | | | |
|---|---|---|---|---|---|---|---|
| Ex. Or Comp. Ex. No. | AS/AN Charged | Wt. % Water Charged | AS | $(NH_4)_2SO_4 \cdot 2(NH_4NO_3)$ | $(NH_4)_2SO_4 \cdot 3(NH_4NO_3)$ | AN | Wt. % Water in Product |
| 32(Comp.) | 0.999 | 2.34 | 22 | 65 | 13 | 0.3 | 0.60 |
| 33 | 0.999 | 3.32 | 23 | 72 | 5 | 0 | 0.59 |
| 34 | 0.999 | 4.28 | 25 | 72 | 3 | 0 | 0.7 |
| 35 | 0.999 | 5.22 | 24 | 77 | 0 | 0 | 0.73 |
| 36 | 0.999 | 6.15 | 26 | 71 | 3 | 0 | 0.71 |

The densities of the products of Comparative Examples 8–9, 27–28 and Examples 10–11, 29–30 were determined as follows. After the beakers containing the products were cooled, they were broken away freeing short cylinders of products. The bottom and sides were very smooth, but the top required hand sanding with silicon carbide paper to provide a uniform flat surface. The densities were then determined from measurements of the dimensions and weights of the cylinders. The product densities increased with increasing water contents as shown in Table VI.

TABLE VI

| Ex. Or Comp. Ex. No. | Reaction Temp., ° C. | Product Density, g/cm$^3$ | Wt. % Water in Product |
|---|---|---|---|
| 8 (Comp.) | 190 | 1.27 | 0.07 |
| 9 (Comp) | 190 | 1.24 | 0.03 |
| 10 | 190 | 1.46 | 0.49 |
| 11 | 190 | 1.50 | 0.50 |
| 27 (Comp.) | 200 | 1.40 | 0.07 |
| 28 (Comp.) | 200 | 1.33 | 0.08 |
| 29 | 200 | 1.45 | 0.56 |
| 30 | 200 | 1.47 | 0.48 |

The multiple effects of water on product compositions and density seen from the data of Tables IV–VI and FIGS. 3–7 are surprising and unanticipated in the prior art.

Examples 37–38

Two ammonium sulfate nitrate materials were prepared and were examined for ammonium sulfate crystallite size and uniformity of dispersion amongst the crystals of double salt. Two charges were prepared, each consisted of 31.15 g of reagent grade ammonium sulfate (Fisher Scientific), 18.85 g of ammonium nitrate and 5.0 g of water. The ammonium sulfate and ammonium nitrate were in a molar ratio of 1.001:1. The ammonium sulfate had been ground to fine particles passing a Tyler No. 230 sieve (270 micrometer openings). The ammonium nitrate was ground from prills in a mortar and pestle.

The batches were mixed in small beakers and placed into an oven at 180° C. Upon melting of the charge, the beakers were taken from the oven, mixed, and returned to the oven. One batch was removed, mixed and returned to the oven several times during the next 30 minutes. The other batch remained undisturbed in the oven for the 30 minutes after the initial mixing. At the end of this period, the beakers were removed from the oven and cooled to room temperature.

XRD analyses of the products showed identical phase compositions: 23 wt. % ammonium sulfate, 77 wt. % 1:2 double salt, and no 1:3 double salt or residual ammonium nitrate. Residual water was 0.48 wt. %. A measure of the crystallite size and perfection (CRP) was determined for each sample by the x-ray method described previously. On the assumption that x-ray peak broadening was entirely due to crystallite size, a lower bound estimate of crystallite size was obtained. The results are shown in Table VI.

TABLE VII

| | | Crystallite size, micrometers | |
|---|---|---|---|
| Ex. No. | Stirring Condition | Ammonium sulfate | $(NH_4)_2SO_4 \cdot 2(NH_4NO_3)$ |
| 37 | Once | >8 | 0.18 |
| 38 | Frequently | 0.35 | 0.37 |

The crystallite sizes, as determined by XRD, of both the ammonium sulfate and 1:2 double salt phases are less than about 1 micrometer for a well mixed system, indicating optimum intimacy of the ammonium sulfate with the 1:2 double salt. However, microscopic examination revealed some ammonium sulfate crystals having dimensions of about 35 micrometers in the frequently stirred sample. These may be undissolved remnants of the ammonium sulfate particles (minus 270 micrometer size) in the initial charge.

The samples were also examined with an energy dispersive spectrometer attached to a scanning electron microscope set to detect sulfur, at a magnification and settings having a resolution of about 2 micrometers. No segregation of ammonium sulfate was detected at this scale except for the particles previously noted. The dispersion of ammonium sulfate in the 1:2 double salt phase was at a scale finer than the 2 micrometer resolution of the magnification and settings used. This fine scale of dispersion is highly advantageous in terms of the ammonium sulfate acting as an inhibitor to detonation.

Example 39

Accelerated rate calorimetry (ARC) was conducted by an independent testing laboratory on samples provided by Honeywell International Inc. The ARC method involves subjecting a sample to specified heat input until a self-accelerating reaction is identified. The particular method employed was an Open ARC Method in which a thermocouple is placed directly into the sample material in an open vessel. This method is used for highly energetic reaction systems which cannot be contained in a closed vessel and has been shown to provide consistent results for interpreting thermal hazard.

The several samples tested consisted of:

Ammonium sulfate nitrate material of the invention, prepared from an equi-molar mixture of ammonium sulfate and ammonium nitrate 1:3 double salt containing about 1–2 wt. % ammonium sulfate and about 3 wt. % ammonium nitrate.

Ammonium nitrate

The onset temperatures for spontaneous and energetic decomposition are shown in Table VIII.

TABLE VIII

| Material | Onset Temp., ° C. |
|---|---|
| Ammonium sulfate nitrate | 220–236 |
| 1:3 double salt | 211 |
| Ammonium nitrate | 205–210 |

It is seen that the ammonium sulfate nitrate of the invention was more stable (higher onset temperature) than either the 1:3 double salt or ammonium nitrate.

Example 40

Tests were conducted according to United Nations Recommendations on the Transport of Dangerous Goods, "Manual of Tests and Criteria, 1995", "Section 34, Classification Procedures, Test Methods and Criteria Relating to Oxidizing Substances of Division 5.1". "The test method is designed to measure the potential for a solid substance to increase the burning rate or burning intensity of a combustible substance when the two are thoroughly mixed."

A substance to be tested is mixed with cellulose in 4:1 and 1:1 proportions by mass, formed into a conical pile of specific dimensions and heated from beneath by a electrically powered (red hot) Nichrome wire. A substance is deemed to be not an oxidizer, if in both the 4:1 and 1:1 sample-to-cellulose ratios, it does not ignite and burn in three minutes or if it exhibits mean burning times greater than that of a 3:7 mixture of potassium bromate and cellulose.

The samples tested were:

1. Control consisting of 9 g potassium bromate+21 g cellulose. The potassium bromate was screened to have particles between 0.15 and 0.3 mm dimension.
2. 15 g ammonium sulfate nitrate of the invention+15 g cellulose. The ammonium sulfate nitrate was screened to have particles between 1.70 and 3.55 mm. Its composition was 23 wt. % ammonium sulfate, 77 wt. % 1:2 double salt and contained no 1:3 double salt or ammonium nitrate.
3. 24 g ammonium sulfate nitrate of the invention as above+6 g cellulose.
4. cellulose alone.
5. 15 g ammonium nitrate+15 g cellulose. The ammonium nitrate particles were retained on a Tyler No. 10 sieve (+1.70 mm).

The results of the tests are shown in Table IX.

TABLE IX

| Sample | Time to Flame, sec | Time to Burnout, sec |
|---|---|---|
| 3:7 (w/w) KBrO$_3$:cellulose | 10 | 128 |
| 1:1 (w/w) ammonium sulfate nitrate:cellulose | No flame > 3 min | — |
| 4:1 (w/w) ammonium sulfate nitrate:cellulose | No flame > 3 min | — |
| Cellulose | No flame > 3 min | — |
| 1:1 ammonium nitrate:cellulose | 60 | 93 |

The tests show the ammonium sulfate nitrate of the invention is not an oxidizer.

Example 41

The moisture sensitivity of an ammonium sulfate nitrate of the invention was determined in comparison to ammonium sulfate and ammonium nitrate by measurement of "Critical Humidity" levels. Critical humidity is that relative humidity (R.H.), where at a given temperature, the material begins to absorb moisture from the atmosphere. Tests were conducted by method IFDC S-101, as described in "Manual For Determining Physical Properties of Fertilizer", 2 Ed., 1993, International Fertilizer Development Center located in Muscle Shoals, Ala.

The ammonium sulfate tested was the milled and sieved material described in Comparative Example 1. The ammonium nitrate was reagent grade from Fisher Scientific. The ammonium sulfate nitrate of the invention was composed of 23 wt. % ammonium sulfate, 77 wt. % 1:2 double salt and contained essentially no 1:3 double salt or ammonium nitrate.

The Critical Humidity levels measured at 30° C. were as follows:

Ammonium sulfate-80% R.H.

Ammonium sulfate nitrate of the invention-75% R.H.

Ammonium nitrate-60% R.H.

It is seen that the ammonium sulfate nitrate of the invention was much less sensitive to moisture than ammonium nitrate and similar to ammonium sulfate in this regard.

Having thus described the invention in rather full detail, it will be understood that such detail need not be strictly adhered to but that further changes and modifications may suggest themselves to one skilled in the art, all falling with the scope of the invention as defined by the subjoined claims.

What is claimed is:

1. A non-explosive ammonium sulfate nitrate composite material comprising by x-ray diffraction analysis:
    about 14 wt. % to about 35 wt. % ammonium sulfate ($(NH_4)_2SO_4$);
    about 60 wt. % to about 85 wt. % $(NH_4)_2SO_4 \cdot 2(NH_4NO_3)$ double salt; and
    to about 5 wt. % in combined total $(NH_4)_2SO_4 \cdot 3(NH_4NO_3)$ double salt and ammonium nitrate ($NH_4NO_3$).

2. The ammonium sulfate nitrate composite material of claim 1, wherein the combined total of $(NH_4)_2SO_4 \cdot 3(NH_4NO_3)$ double salt and ammonium nitrate ($NH_4NO_3$) is 0 to about 3 wt. %.

3. The ammonium sulfate nitrate composite material of claim 1, wherein the ammonium nitrate ($NH_4NO_3$) is 0 to about 1 wt. %.

4. The ammonium sulfate nitrate composite material of claim 1 in the form of prills.

5. A non-explosive ammonium sulfate nitrate composite material, by x-ray diffraction analysis, consisting essentially of:
    about 14 wt. % to about 35 wt. % ammonium sulfate ($(NH_4)_2SO_4$);
    about 60 wt. % to about 85 wt. % $(NH_4)_2SO_4 \cdot 2(NH_4NO_3)$ double salt; and
    0 to about 5 wt. % in combined total $(NH_4)_2SO_4 \cdot 3(NH_4NO_3)$ double salt and ammonium nitrate ($NH_4NO_3$).

6. The ammonium sulfate nitrate composite material of claim 5, wherein the combined total of $(NH_4)_2SO_4 \cdot 3(NH_4NO_3)$ double salt and ammonium nitrate ($NH_4NO_3$) is 0 to about 3 wt. %.

7. The ammonium sulfate nitrate composite material of claim 5, wherein the ammonium nitrate ($NH_4NO_3$) is 0 to about 1 wt. %.

8. The ammonium sulfate nitrate composite material of claim 5 in the form of prills.

9. A method for the production of an ammonium sulfate nitrate composite material comprising the steps of:
   (a) charging materials comprising ammonium sulfate particles, ammonium nitrate and water to a melting device, wherein the molar ratio of ammonium sulfate to ammonium nitrate is about 0.9:1 to about 1.1:1 and the water is more than 2 wt. % to about 10 wt. % of the charged materials;
   (b) melting the ammonium nitrate and dissolving at least a portion of the ammonium sulfate particles at a temperature of about 180° C. to about 210° C.;
   (c) reacting the charged materials at a temperature of about 180° C. to about 210°C.; and
   (d) solidifying the product at a cooling rate of at least about 100° C./min.

10. A method for the production of an ammonium sulfate nitrate composite material comprising the steps of:
    (a) charging materials consisting essentially of ammonium sulfate particles, ammonium nitrate and water to a melting device, wherein the ammonium sulfate and ammonium nitrate are in a molar ratio between about 0.9:1 to about 1.1:1 and the water is more than 2 wt. % to about 10 wt. % of the charged materials;
    (b) melting the ammonium nitrate and dissolving at least a portion of the ammonium sulfate particles at a temperature of about 180° C. to about 210° C.;
    (c) reacting the charged materials at a temperature of about 180° C. to about 210° C.; and
    (d) solidifying the product at a cooling rate of at least about 100° C./min.

11. The method of claim 10, wherein the ammonium sulfate and the ammonium nitrate are of at least about 90 wt. % purity.

12. The method of claim 10, wherein the ammonium sulfate and the ammonium nitrate are of at least about 95 wt. % purity.

13. The method of claim 10, wherein the ammonium sulfate and the ammonium nitrate are of at least about 97 wt. % purity.

14. The method of claim 10, wherein the particles of ammonium sulfate are at least about 85 wt. % passable through a Tyler No. 48 sieve (0.030 mm opening).

15. The method of claim 10, wherein the particles of ammonium sulfate are at least about 99 wt. % passable through a Tyler No. 48 sieve (0.030 mm opening).

16. The method of claim 10, wherein the particles of ammonium sulfate are at least about 99 wt. % passable through a Tyler No. 48 sieve (0.030 mm opening) and at least about 50 wt. % passable through a Tyler No. 200 sieve (0.074 mm opening).

17. The method of claim 10, wherein the melting and reaction temperatures are about 190° C. to about 205° C.

18. The method of claim 10, wherein the melting and reaction temperatures are about 190° C. to about 200° C.

19. The method of claim 10, wherein the water is more than 2 wt. % to about 5 wt. % of the charged materials.

20. The method of claim 10, wherein the water is about 2.5 wt. % to about 4 wt. % of the charged materials.

21. The method of claim 10, wherein the method is carried out in a continuous process.

22. The method of claim 10, wherein the solidification of the product at a cooling rate of at least about 100° C./min takes place in a prilling tower.

23. An ammonium sulfate nitrate composite material prepared by the process comprising the steps of:
    (a) charging materials consisting essentially of ammonium sulfate particles, ammonium nitrate and water to a melting device, wherein the ammonium sulfate and ammonium nitrate are in a molar ratio between about 0.9:1 to about 1.1:1 and the water is more than 2 wt. % to about 10 wt. % of the charged materials;
    (b) melting the ammonium nitrate and dissolving at least a portion of the ammonium sulfate at a temperature of about 180° C. to about 210° C.;
    (c) reacting the charged materials at a temperature of about 180° C. to about 210° C.; and
    (d) solidifying the product at a cooling rate of at least about 100° C./min.

* * * * *